United States Patent
Boonekamp

(10) Patent No.: US 8,425,101 B2
(45) Date of Patent: Apr. 23, 2013

(54) ILLUMINATION SYSTEM, LUMINAIRE AND BACKLIGHTING UNIT

(75) Inventor: Erik Boonekamp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 648 days.

(21) Appl. No.: 12/600,871

(22) PCT Filed: May 26, 2008

(86) PCT No.: PCT/IB2008/052057
§ 371 (c)(1),
(2), (4) Date: Nov. 19, 2009

(87) PCT Pub. No.: WO2008/146229
PCT Pub. Date: Dec. 4, 2008

(65) Prior Publication Data
US 2010/0172152 A1    Jul. 8, 2010

(30) Foreign Application Priority Data
May 29, 2007    (EP) .................................... 07109065

(51) Int. Cl.
*F21V 7/04* (2006.01)
(52) U.S. Cl.
USPC .......... 362/609; 362/97.1; 362/923; 362/97.2
(58) Field of Classification Search ........ 362/97.1–97.4, 362/609
See application file for complete search history.

(56) References Cited

U.S. PATENT DOCUMENTS

| | | | |
|---|---|---|---|
| 5,709,460 A | 1/1998 | Lester | |
| 7,165,874 B2 * | 1/2007 | Nagakubo et al. | 362/623 |
| 7,976,209 B2 * | 7/2011 | Iwasaki et al. | 362/628 |
| 2005/0185422 A1 | 8/2005 | Henriet et al. | |
| 2006/0256578 A1 | 11/2006 | Yang et al. | |
| 2006/0262310 A1 | 11/2006 | Starry et al. | |

FOREIGN PATENT DOCUMENTS

| | | |
|---|---|---|
| DE | 202005005306 U1 | 8/2006 |
| EP | 1705514 A1 | 9/2006 |
| JP | 2006179658 | 7/2006 |
| JP | 2006221922 | 8/2006 |
| WO | 2005019879 A1 | 3/2005 |
| WO | 2005083317 A1 | 9/2005 |

* cited by examiner

*Primary Examiner* — Ababel Ton
(74) *Attorney, Agent, or Firm* — John F. Salazar; Mark L. Beloborodov

(57) ABSTRACT

The invention relates to an illumination system (2), aluminaire (2), a backlighting system and a display device. The illumination system according to the invention comprises a light exit window (30) for emitting light from the illumination system, and a diffuse reflecting screen (40) arranged opposite the light exit window. The illumination system further comprises a light source (20) which is arranged for indirect illumination of the light exit window via the diffuse reflecting screen. The light source is arranged near an edge of the light exit window on an imaginary plane (22) arranged substantially parallel to the light exit window and emits light away from the light exit window. The illumination system further comprises an edge wall (62) comprising a specular reflecting mirror (60) being concavely shaped for reflecting at least part of the light emitted by the light source towards the diffuse reflecting screen. The effect of the illumination system according to the invention is that the use of the specular reflecting mirror enables a controlled reflection of the part of the light emitted by the light source towards the diffuse reflecting screen.

11 Claims, 6 Drawing Sheets

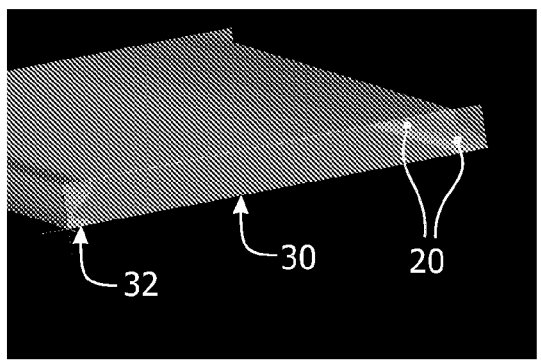
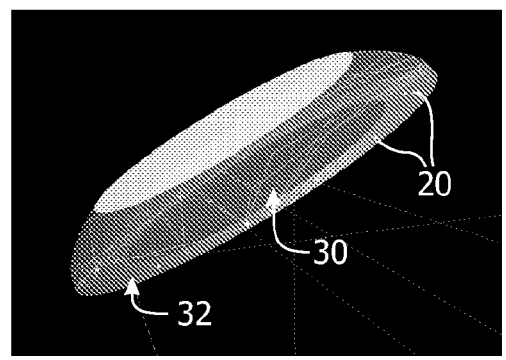
FIG. 2A  FIG. 2B
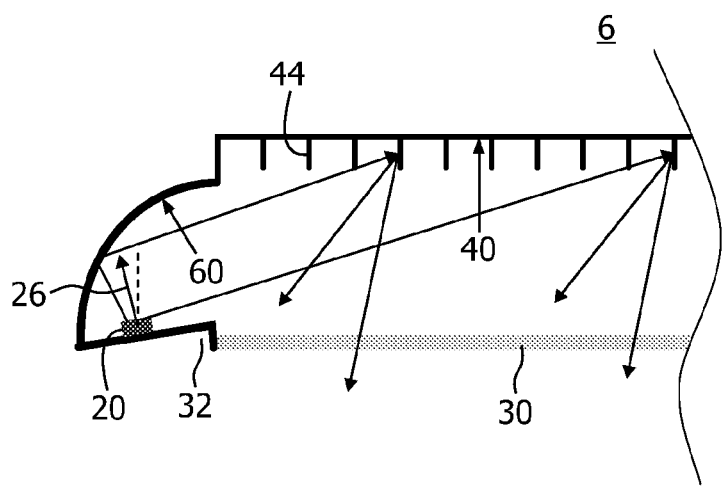
FIG. 3A

ILLUMINATION SYSTEM, LUMINAIRE AND BACKLIGHTING UNIT

FIELD OF THE INVENTION

The invention relates to an illumination system having a light exit window for emitting light from the illumination system.

The invention also relates to a backlighting system, comprising the illumination system according to the invention, a luminaire comprising the illumination system according to the invention, and a display device comprising the backlighting system according to the invention.

BACKGROUND OF THE INVENTION

Such illumination systems are known per se. They are used, inter alia, as luminaire for general lighting purposes, for example, for office lighting or for shop lighting, for example, shop window lighting or lighting of (transparent or semi-transparent) plates of glass or of (transparent) plates of glass or of (transparent) synthetic resin on which items, for example jewelry, are displayed. An alternative application is the use of such illumination systems for illuminating advertising boards, billboards as a display device.

The known illumination systems are also used as light sources in backlighting systems in (picture) display devices, for example, for TV sets and monitors. Such illumination systems are particularly suitable for use as backlighting systems for non-emissive displays such as liquid crystal display devices, also denoted LCD panels, which are used in (portable) computers or (portable) telephones.

Said display devices usually comprise a substrate provided with a regular pattern of pixels which are each controlled by at least one electrode. The display device utilizes a control circuit for achieving a picture or a data graphical display in a relevant field of a (picture) screen of the (picture) display device. The light originating from the backlighting system in an LCD device is modulated by means of a switch or modulator in which various types of liquid crystal effects may be used. In addition, the display may be based on electrophoretic or electromechanical effects.

Such an illumination system for illuminating an image display device is known from the US patent application US 2006/0262310. The illumination system comprises two light emitting diodes providing light to an optical cavity. The diodes may be colored or white. The optical cavity is lined with a diffuse reflector. The diffuse reflector both increases reflectance and mixes the discrete light colors adequately to form a white light source for illuminating a liquid crystal display device. A disadvantage of the known illumination system is that the uniformity over the light-emitting window is relatively poor.

SUMMARY OF THE INVENTION

It is an object of the invention to provide an illumination system having improved uniformity. The illumination system according to various embodiments of the invention includes:
  a diffuse reflecting screen arranged opposite the light exit window,
  a light source being arranged for indirect illumination of the light exit window via the diffuse reflecting screen, the light source being arranged near an edge of the light exit window on an imaginary plane substantially parallel to the light exit window, the light emitted from the light source comprising an angular distribution around a central vector, the central vector pointing away from the light exit window, and
  an edge wall arranged between the diffuse reflecting screen and the light exit window, the edge wall comprising a specular reflecting mirror being concavely shaped for reflecting at least part of the light emitted by the light source towards the diffuse reflecting screen, wherein the central vector is inclined with respect to a normal axis of the imaginary plane for reducing a glare of the illumination system.

The effect of the luminaire according to the invention is that the use of the specular reflecting mirror enables a controlled reflection of the part of the light emitted by the light source towards the diffuse reflecting screen. The concave shape of the specular reflecting mirror can be used to control a distribution of the reflected light over at least part of the diffuse reflecting screen. Typically a further part of the light emitted by the light source directly impinges on the diffuse reflecting screen. The diffuse reflecting screen subsequently scatters the impinging light towards the light exit window. The luminance distribution at the light exit window of the illumination system according to the invention is determined by a combination of the specular reflecting mirror and the diffuse reflecting screen and may be influenced by the concave shape of the specular reflecting mirror. When, for example, a specific shape of the specular reflecting mirror is chosen, a substantially uniformly luminance distribution may be obtained at the light exit window of the illumination system.

In the known illumination system, the illumination system comprises an optical cavity which is covered with a diffuse reflector and comprises two light emitting diodes as light source for providing light to the optical cavity. The light emitting diodes are arranged for emitting light towards the diffuse reflector. The optical cavity of the known illumination system does not comprise arrangements for actively distributing the light emitted by the light emitting diodes over a surface of the diffuse reflector. Consequently, an additional diffuser and a brightness enhancement film are necessary to improve the uniformity of the luminance over the liquid crystal display device. In the illumination system according to the invention, the specular reflecting mirror enables a controlled distribution of part of the light emitted by the light source over part of the diffuse reflecting sheet, which enables an active control of the luminance distribution over the light exit window.

Furthermore, the central vector is inclined with respect to a normal axis of the imaginary plane for reducing a glare of the illumination system. Preferably, the central vector is inclined away from the light exit window. A benefit of this embodiment is that the inclination of the central vector further reduces light to directly impinge on the light exit window, consequently reducing the glare of the illumination system. Glare results from excessive contrast between bright and dark areas in the field of view. Glare can, for example, result from directly viewing a filament of an unshielded or badly shielded light source. Especially when using the illumination system in a luminaire, the inclination of the central vector of the light source prevents direct view into the light source by a user near the luminaire, and thus reduces the glare of the luminaire and increases the visual comfort of the user. A further benefit of the arrangement of the light source in which the central vector is inclined with respect to the normal axis away from the light exit window is that the arrangement enables an improvement of the uniformity and efficiency of the illumination system. When the central vector is substantially parallel to the normal axis, part of the light emitted by the light source may impinge on an opposite edge wall of the illumination system which may reduce the uniformity of light across the diffuse reflecting screen. By inclining the light source away from the light exit window light from the light source is prevented to reflect via the opposite edge of the light exit window thus improving the uniformity and efficiency. When the light source is tilted, the shape of the specular reflecting mirror may be adapted to ensure optimal distribution of the light from the light source over the diffuse reflecting screen and/or to reduce a height of the illumination system. The height of the illumination system is a dimension of the illumination system) substantially perpendicular to the light exit window.

In an embodiment of the invention, the specular reflecting mirror comprises a shape for generating a substantially uniform illumination of the part of the diffuse reflecting screen. A benefit of this embodiment is that the diffuse reflecting screen may be arranged substantially parallel to the light exit window, which results in a reduced height of the illumination system. When the diffuse reflecting screen is not uniformly illuminated while the required predefined luminance distribution at the light exit window is a substantially uniform luminance distribution, the diffuse reflecting screen may be curved to compensate for the non-uniform illumination and thus obtain the required uniform luminance distribution at the light exit window. The diffuse reflecting screen may, for example, be concavely shaped, convexly shape or a combination of concavely and convexly shaped which results in a relatively large thickness of the illumination system. When choosing a shape of the specular reflecting mirror such that the diffuse reflecting screen is substantially uniformly illuminated, the light scattered from the diffuse reflecting screen towards the light exit window results in a substantially uniform illumination of the light exit window. As a result, the diffuse reflecting screen may, for example, be arranged substantially parallel to the light exit window which results in relatively thin illumination system.

In an embodiment of the invention, the specular reflecting mirror comprises a paraboloidal shape. The paraboloidal shape of the specular reflecting mirror is especially beneficial when the angular distribution of the light emitted by the light source resembles a Lambertian light distribution. The paraboloidal specular reflecting mirror reflects part of the Lambertian light distribution towards the diffuse reflecting screen resulting in a substantially uniform distribution of the reflected light over the diffuse reflecting screen.

In an embodiment of the invention, the light source is arranged on a ridge arranged at the edge of the light exit window, the specular reflecting mirror being arranged at a side of the light source facing away from the light exit window. A benefit of this embodiment, especially when the illumination system is used in a luminaire, is that the light source in the luminaire may be cooled relatively easily. In an office environment, the luminaire for illuminating the office is usually built-in into the ceiling of the office, or is fixed against the ceiling of the office. When the light source requires cooling, for example, when using a light emitting diode as light source, the luminaire must contain an active cooling system for cooling the light source, for example, a fan or a Peltier element. These arrangements are relatively expensive and may limit the life-time of the luminaire. When arranging the light source on the ridge arranged at the edge of the light exit window, the ridge may comprise cooling fins at the exterior of the luminaire, next to the light exit window which enables a cooling of the light source without requiring the active cooling system. This reduces the cost and increases the reliability of the luminaire.

In an embodiment of the invention, the diffuse reflecting screen comprises a structured reflecting surface. A benefit of this embodiment is that the structured reflecting surface avoids specular reflections which may occur when light impinges on a diffuse reflecting surface at grazing angles. The structured reflecting surface may, for example, be generated via roughening the reflecting surface, for example, using a spray coated reflector, or using lamellae, or having an undulated surface, or using a substantially transparent prismatic sheet. Such a transparent prismatic sheet is, for example, commercially known as a Transmissive Right Angle Film (also known as TRAF), or a Brightness Enhancement Film (also known as BEF) or an Optical Lighting Foil (also known as OLF). These substantially transparent prismatic sheets redirect the light impinging at grazing angles to impinge at the diffuse reflecting screen at an angle closer to a normal of the diffuse reflecting screen.

In an embodiment of the invention, the structured reflecting surface comprises a plurality of elongated prismatic structures, or comprises a plurality of pyramidal structures, or comprises a plurality of conical structures. As indicated before, these structures prevent the light reflected by the specular reflecting mirror to impinge on the diffuse reflecting screen at grazing angles.

In an embodiment of the invention, the diffuse reflecting screen comprises a collimating plate, or comprises a redirecting foil, or comprises a plurality of lamellae arranged substantially perpendicular to the diffuse reflecting screen. Again, the use of a collimating plate, redirecting foil or lamellae prevents the light reflected by the specular reflecting mirror to impinge on the diffuse reflecting screen at grazing angles. The collimating plate and the redirecting foil typically are constituted of translucent material which is arranged to redirect a grazing light beam, for example, from the specular reflecting mirror, to impinge on the diffuse reflecting screen at an angle near a normal axis to the diffuse reflecting screen.

In an embodiment of the invention, a ratio between a height of the illumination system and a width of the light exit window is larger than or equal to 1/20, wherein the height is a dimension of the illumination system substantially perpendicular to the light exit window and wherein the width of the light exit window is a minimum dimension of the light exit window substantially parallel to the light exit window When the width of the light exit window is more than 20 times the height of the illumination system, the luminance distribution at the light exit window is difficult to control. A relatively small variation in the shape of the specular reflecting mirror or in the position of the light source with respect to the specular reflecting mirror may already have a significant impact on the luminance distribution at the light exit window.

In an embodiment of the invention, the illumination system comprises a remote phosphor layer arranged on the diffuse reflecting screen and/or on the light exit window, the remote phosphor layer being a layer comprising a luminescent material for converting at least part of the light emitted by the light source into light having a different color. A remote phosphor enables optimization of the color rendering index (further also referred to as CRI) of the illumination system, which is especially beneficial when the illumination system is used in a general lighting application. Furthermore, the use of the remote phosphor for determining a color of the light emitted by the illumination system typically results in an improved efficiency and a wider variety of luminescent materials to choose from compared to illumination system in which the luminescent material is directly applied to the light source, fov example, on a low-pressure discharge lamp or on a phosphor converted light emitting diode.

In an embodiment of the invention, the illumination system further comprises an array of further light sources arranged on the diffuse reflecting screen for direct illumination of the light exit window, a color of the light emitted by the light source being different from a color of the light emitted by the array of further light sources. A benefit of this embodiment is that a color of the light emitted by the illumination system can be tuned, for example, by tuning an amount of light emitted by the light source. The light emitted by the light source is distributed, partially via the specular reflective mirror, over the diffuse reflecting screen which results, tor example, in a substantially uniform distribution of the light emitted by the light source at the light exit window. The light of the light source mixes with the light emitted by the array of further light sources and determines a color of the light emitted by the illumination system according to the invention. Tuning the amount of light emitted by the light source determines a change of the color of the overall light emitted by the illumination system. In this way, only a few light sources, for example, arranged at the edge of the light exit window, are required to obtain a color-tunable illumination system.

In an embodiment of the invention, the light exit window comprises a diffuser, or a Brightness Enhancement Film, or Micro Lighting Optics, or a prismatic sheet, or a plurality of lamellae arranged substantially perpendicular to the light exit window. The Brightness Enhancement Film, or Micro Lighting Optics are commercially available products for redirecting light emitted from an illumination system, for example, when the illumination system is used in a backlighting system. Furthermore, when the listed sheets or films are used on the light exit window of the illumination system, the uniformity of the light emitted by the illumination system is further improved.

In an embodiment of the luminaire according to the invention, the luminaire comprises a plurality of illumination systems arranged adjacent to each other. A benefit of this embodiment is that substantially any size backlighting system and/or luminaire can be produced in which, for example, the light distribution of the light emitted via the light exit window of each of the plurality of illumination systems is substantially uniform.

BRIEF DESCRIPTION OF THE DRAWINGS

These and other aspects of the invention are apparent from and will be elucidated with reference to the embodiments described hereinafter.

In the drawings:

FIGS. 2A and 2B show partially transparent three-dimensional views of the illumination system according to the invention, FIGS. 3A, 3B and 3C show partial cross-sectional views of further embodiments of the illumination system according to the invention.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1A:
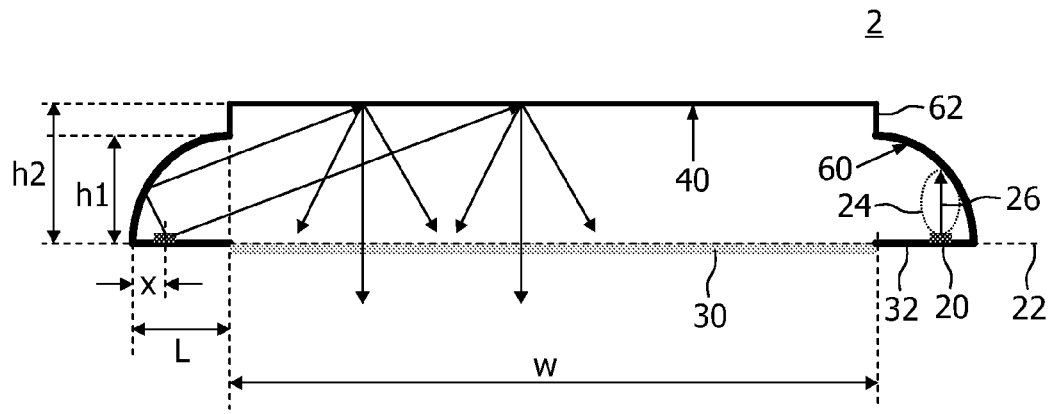
FIGS. 1A, 1B and 1C show a cross-sectional view of an illumination system according to the invention.
Figure 1B:
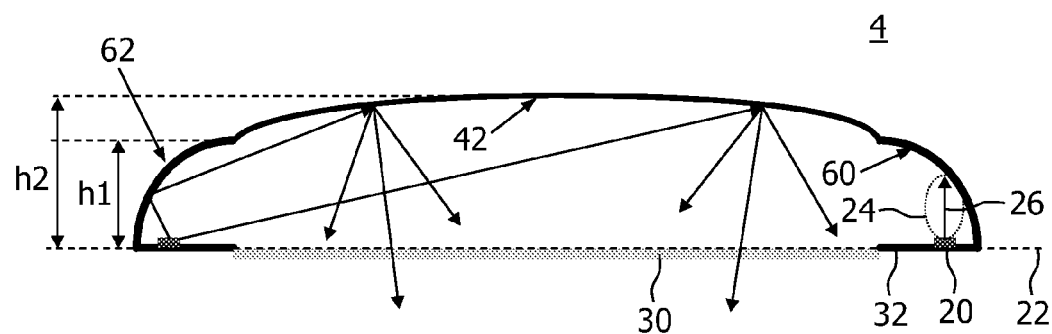
Figure 1C:
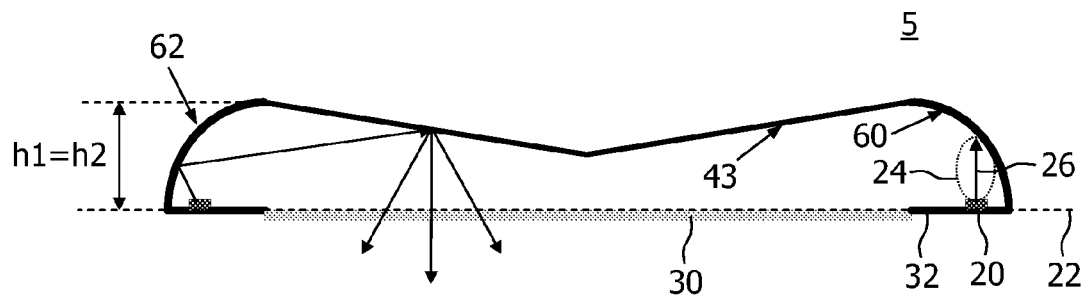

FIGS. 1A, 1B and 1C show a cross-sectional view of an illumination system 2, 4, 5 according to the invention. The illumination system 2, 4, 5 according to the invention comprises a light exit window 30 for emitting light from the illumination system 2, 4, 5, and a diffuse reflecting screen 40, 42, 43 arranged opposite the light exit window 30. The illumination system 2, 4, 5 further comprises a light source 20 which is arranged for indirect illumination of the light exit window 30 via the diffuse reflecting screen 40, 42, 43. The light source 20 is arranged near an edge of the light exit window 30 on an imaginary plane 22 arranged substantially parallel to the light exit window 30. The light emitted from the light source 20 comprises an angular distribution 24 around a central vector 26. The central vector 26 points away from the light exit window 30 substantially parallel to a normal axis (not shown) of the imaginary plane 22 or inclined with respect to the normal axis of the imaginary plane 22 away from the light exit window 30. The illumination system 2, 4, 5 according to the invention further comprises an edge wall 62 which is arranged between the diffuse reflecting screen 40, 42, 43 and the light exit window 30. The edge wall 62 comprises a specular reflecting mirror 60 being concavely shaped for reflecting at least part of the light emitted by the light source 20 towards the diffuse reflecting screen 40, 42, 43.

In a preferred embodiment of the illumination system 2, 4, 5 according to the invention, the light source 20 is a light emitting diode 20 (further also referred to as LED). However, the light source 20 may be any suitable light source, such as a low-pressure discharge lamp, a high-pressure discharge lamp, an incandescent lamp or a laser light source.

In the embodiment of the illumination system 2, 4, 5 as shown in FIGS. 1A, 1B and 1C, the light source 20 is arranged on a ridge 32 arranged at the edge of the light exit window 30. The ridge 32 has a width L and is, in the embodiment shown, arranged adjacent to the light exit window 30. The edge wall 62 which comprises the specular reflecting mirror 60 connects the diffuse reflecting screen 40, 42, 43 with the ridge 32. Alternatively, the ridge 32 may be constituted of separate protrusions from the illumination system 2, 4, 5 which comprise the light source 20 and the concavely shaped specular reflecting mirror 60. In the embodiment shown in FIGS. 1A, 1B and 1C the ridge 32 is relatively large. The exact dimensions of the ridge 32, curvature of the specular reflecting mirror 60 and a width w of the light exit window 30 may vary, for example, depending on the uniformity requirements.

The illumination system 2, 4, 5 according to the invention has a height h2 which is a dimension of the illumination system 2, 4, 5 in a direction substantially perpendicular to the light exit window 30. The light exit window 30 of the illumination system 2, 4, 5 has a width w which is a minimum dimension of the light exit window 30 substantially parallel to the light exit window 30. In an embodiment of the illumination system 2 in which the illumination system 2 is a rectangular illumination system 2 (see FIG. 2A), the light exit window 30 also has a length (not indicated) which is a maximum dimension of the light exit window 30 substantially parallel to the light exit window 30 (and typically perpendicular to the width w). The height h2 and the width w of the illumination system 2, 4, 5 according to the invention preferably are arranged such that:

$$\text{height/width} \geqq 1/20.$$

Within this range, the luminance distribution at the light exit window 30 can still be relatively well controlled. The light source 20 is arranged on the ridge 32 at a distance X between the specular reflecting mirror 60 and the light source 20 along an imaginary plane 22. The ridge 32 has a width L.

FIG. 1A shows a preferred embodiment of the illumination system 2 according to the invention in which the diffuse reflecting screen 40 is constituted of a substantially flat surface arranged opposite the light exit window 30. A benefit of this embodiment is that the height h2 of the illumination system 2 can be minimized. For example, the specular reflecting mirror 60 has a parabolic shape or a shape optimized to illuminate the diffuse reflecting screen 40 in a substantially even way. Using, for example, a mirror-height h1 to be equal to 10 mm, height h2 to be equal to 15 mm, distance of the light source 20 from the specular reflecting mirror (indicated with x) to be equal to 1.75 mm, a width of the ridge 32 (indicated with L) to be equal to 10 mm and a width w of the light exit window 30 to be equal to 150 mm a substantially uniform illuminance of the front window was calculated using a ray-trace program. The length of the light exit window 30 is 250 mm and the illumination system 2 comprises 10 LED (5 LEDs on opposite sides of the light exit window 30 along the length of the light exit window 30) and a distance between the LEDs of 50 mm. In the calculations, the diffuse reflecting screen 40 is assumed to be a "Lambertian diffuser". In contrast, in a classical "direct lit" configuration in which the 10 LEDs are arranged on a wall arranged opposite the light exit window 30 and in which the 10 LEDs form a square lattice 130×250 mm2 in which a distance between the LEDs is 57 mm, the distance between the LEDs and the light exit window 30 (equivalent to the height h2 of the illumination system) is required to be approximately 90 mm to obtain a substantially uniform illuminance of the light exit window 30. Consequently, the arrangement of the light source 20 together with the specular reflecting mirror 60 substantially reduces the height h2 of the illumination system 2.

In the embodiment of the illumination system 2 as shown in FIG. 1A the specular reflecting mirror 60 has a mirror-height h1 which is less than the height h2 of the illumination system 2. Due to the additional height h2 of the illumination system 2, the uniformity of the luminance at the light exit window 30 is improved. Alternatively, the curvature of the concavely shaped specular reflective surface may be altered to alter the distribution of the light over the diffuse reflecting screen, for example, to provide a uniform illumination of the light exit window 30 while the height h2 of the illumination system 2 is equal to the mirror-height h1.

FIG. 1B shows an embodiment of the illumination system 4 according to the invention in which the diffuse reflecting surface 42 is curved. Altering the shape of the diffuse reflecting surface 42 to be substantially concavely shaped (as shown in FIG. 1B), may, for example, compensate for a non-uniform illumination of the diffuse reflecting surface 42 and thus may generate the required uniform luminance distribution at the light exit window 30. The diffuse reflecting screen 42 may, for example, be concavely shaped (as shown in FIG. 1B), convexly shape (not shown) or a combination of concavely and convexly shaped (not shown).

FIG. 1C shows an embodiment of the illumination system 5 according to the invention in which the diffuse reflecting surface 43 is substantially bend forming an indentation into the illumination system 5. This shape of the diffuse reflecting surface 43 together with a specific concavely shaped specular reflecting mirror 60 may further reduce the height h2 of the illumination system 5.

FIGS. 2A and 2B show partially transparent three-dimensional views of the illumination system 2, 4 according to the invention. FIG. 2A shows the illumination system 2 according to the invention having a substantially rectangular light exit window 30. The embodiment shown in FIG. 2A comprises ridges 32 arranged on opposite sides of the light exit window 30 arranged along the length of the light exit window 30. Each ridge 32 comprises a plurality of LEDs 20 as light sources 20. FIG. 2B shows the illumination system 4 according to the invention having an ellipsoidal light exit window 30, for example, a circular light exit window 30. The ridge 32 which comprises the plurality of LEDs 20 as light sources 20 is arranged around the circular light exit window 30.

Figure 3B:
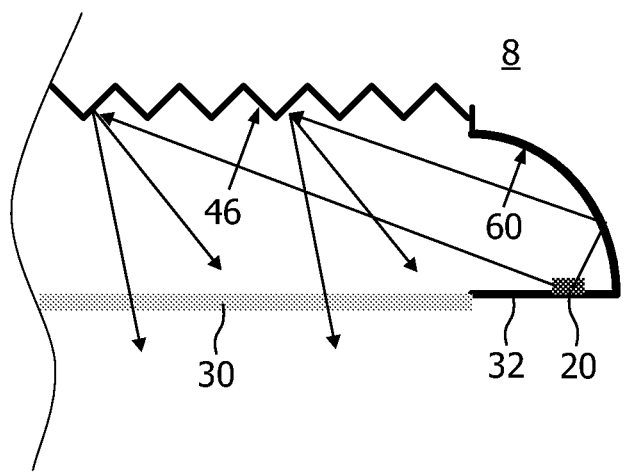
Figure 3C:
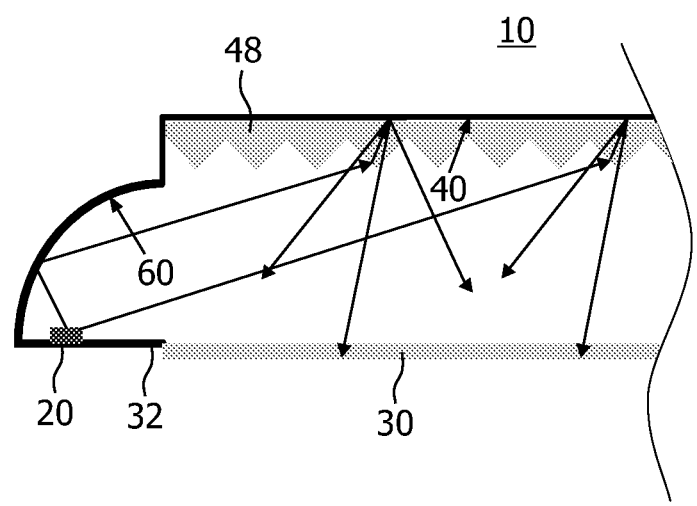

FIGS. 3A, 3B and 3C show partial cross-sectional views of further embodiments of the illumination system 6, 8, 10 according to the invention. The embodiment shown in FIG. 3A comprises a ridge 32 which is inclined with respect to the imaginary plane 22 (see FIG. 1A) such that the central vector 26 of the LEDs 20 is inclined with respect to a normal axis (not shown) of the light exit window 30. Due to the inclined ridge 32, the angle of inclination of the central vector 26 is away from the light exit window 30 which prevents direct illumination of the light exit window 30 by the LEDs 20 which reduces a glare of the illumination system 6 according to the invention. Alternatively, the combination of the light emitting diode 20 together with the specular reflecting mirror may be inclined compared to the embodiments shown in FIGS. 1A, 1B and 1C to prevent light from the light emitting diode 20 to reflect via an opposite edge wall 62 of the illumination system 6 (not shown), thus improving the uniformity and efficiency. The embodiment shown in FIG. 3A further comprises a plurality of lamellae 44 arranged substantially perpendicular to the diffuse reflecting screen 40. The surface of the lamellae 44 also reflects impinging light diffusely. Applying the plurality of lamellae 44 substantially prevents light reflected from the specular reflecting mirror 60 to impinge on the diffuse reflecting screen 40 at large grazing angles. Instead, light approaching the diffuse reflecting screen 40 at relatively large grazing angles impinges on the diffusely reflecting lamellae 44 and is substantially diffusely reflected by the lamellae 44. When light impinges on the diffuse reflecting screen 40 at grazing angles a part of the light may not be diffusely reflected but may be substantially specularly reflected. If the light distribution over the diffuse reflecting screen 40 would be substantially uniform, the luminance distribution at the light exit window 30 may not be uniform due to the partial specular reflection of the light impinging at grazing angles on the diffuse reflecting screen 40. By adding a plurality of lamellae 44 the light reflected by the specular reflecting mirror 60 will not impinge at grazing angles at the diffuse reflecting screen 40 and thus the reflection characteristic of the diffuse reflecting screen 40 more closely resembles a substantially Lambertian diffuser.

In an alternative further embodiment of the illumination system 6 according to the invention, the ridge 32 is inclined such that the ridge 32 is positioned substantially perpendicular to the light exit window 32 (not shown).

In the embodiment of the illumination system 8 shown in FIG. 3B, the diffuse reflecting screen 46 comprises a structured surface. The cross-sectional view shown in FIG. 3B may, for example, be a cross-sectional view of elongated prismatic structures 46, or a cross-sectional view of a plurality of pyramidal structures 46, or a cross-sectional view of a plurality of conical structures 46. The effect of this structured surface 46 is to prevent light to impinge on the diffuse reflecting screen 46 at grazing angles which results, as indicated before, in a reflection characteristic of the diffuse reflecting screen 46 to more closely resemble a Lambertian diffuser.

In the embodiment of the illumination system 10 as shown in FIG. 3C, the diffuse reflecting screen 40 further comprises a collimating plate 48 which redirects a light beam towards a normal axis (not shown) of the diffuse reflecting screen 40 before it impinges the diffuse reflecting screen 40. This collimating plate 48, for example, is a transparent prismatic sheet, for example, commercially also known as a Transmissive Right Angle Film (also known as TRAF), or a Brightness Enhancement Film (also known as BEF) or a Dual Brightness Enhancement film (also known as DBEF) or an Optical Lighting Foil (also known as OLF). These substantially transparent prismatic sheets redirect the light impinging at grazing angles to impinge at the diffuse reflecting screen at an angle closer to a normal of the diffuse reflecting screen. This prevents impingement of light at grazing angles improving the diffuse reflection characteristic of the diffuse reflecting screen 40.

Figure 4A:
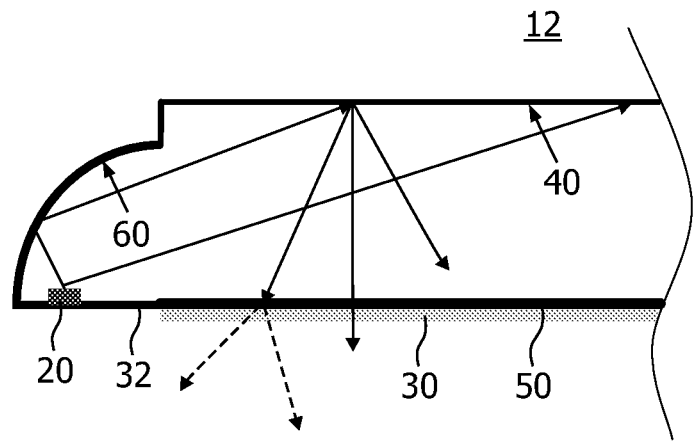
FIGS. 4A and 4B show partial cross-sectional views of embodiments of the illumination system according to the invention comprising a remote phosphor.
Figure 4B:
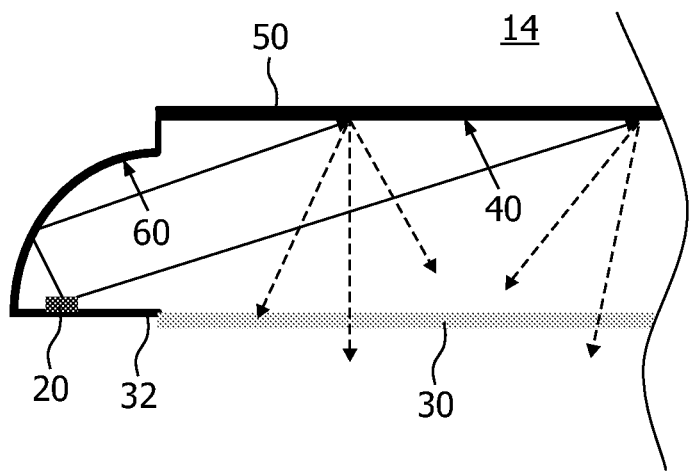

FIGS. 4A and 4B show partial cross-sectional views of embodiments of the illumination system 12, 14 according to the invention comprising a remote phosphor layer 50. In the embodiment shown in FIG. 4A the remote phosphor layer 50 is applied to the light exit window 30. A benefit of this embodiment is that the remote phosphor layer 50 can be applied relatively easily, for example, before assembling the light exit window 30 to the illumination system 12. However, the luminance uniformity at the light exit window 30 is relatively strongly dependent on the uniformity of the remote phosphor layer 50 and on the uniformity of the distribution in the luminescent material in the remote phosphor layer 50. In the embodiment shown in FIG. 4B the remote phosphor layer 50 is applied on the diffuse reflecting screen 40. Alternatively, the luminescent material is applied in a diffusely reflecting layer of the diffuse reflecting screen 40 such that the diffusely reflecting layer acts as the remote phosphor layer. A benefit of this embodiment is that the uniformity of the applied remote phosphor layer 50 is less critical with respect to the luminance uniformity at the light exit window 30 because of the distance between the remote phosphor layer 50 and the light exit window 30. Due to this additional distance between the remote phosphor layer 50 and the light exit window 30, the light generated by the remote phosphor layer 50 is mixed before it is emitted by the illumination system 14 according to the invention. The remote phosphor layer 50 may comprise a single luminescent material or may comprise a mixture of a plurality of different luminescent materials. Alternatively, the illumination system according to the invention comprises a remote phosphor layer 50 at both the light exit window 30 and on the diffuse reflecting screen 40 (not shown). In such an embodiment, the remote phosphor layer 50 applied to the diffuse reflecting screen 40 may be different, for example, may comprise a different luminescent material or a different mixture of luminescent materials compared to the remote phosphor layer 50 applied to the light exit window 30.

In a preferred embodiment, the light emitting diode 20 emits substantially blue light. Part of the blue light will be converted, for example, using $Y_3Al_5O_{12}:Ce^{3+}$ (further also referred to as YAG:Ce) which converts part of the blue impinging light into yellow light. Choosing a right conversion of the blue light into yellow, the color of the light emitted by the illumination system 12, 14 according to the invention may be cool white. The ratio of blue light which is converted by the remote phosphor layer 50 may, for example, be determined by a layer thickness of the remote phosphor layer 50, or, for example, by a concentration of the YAG:Ce particles distributed in the remote phosphor layer 50. Alternatively, for example, $CaS:Eu^{2+}$ (further also referred to as CaS:Eu) may be used, which converts part of the blue impinging light into red light. Adding some CaS:Eu to the YAG:Ce may result in white light having an increased color temperature. Alternatively, the light emitting diode 20 emits ultraviolet light which is converted by the remote phosphor layer 50 into substantially white light. For example a mixture of $BaMgAl_{10}O_{17}:Eu^{2+}$ (converting ultraviolet light into blue light), $Ca_8Mg(SiO_4)_4Cl_2:Eu^{2+}$, $Mn^{2+}$ (converting ultraviolet light into green light), and $Y_2O_3:Eu^{3+}$, $Bi^{3+}$ (converting ultraviolet light into red light) with different phosphor ratios may be used to choose a color of the light emitted from the illumination system 12, 14 which lies in a range from relatively cold white to warm white, for example between 6500K and 2700K. Other suitable phosphors may be used to obtain a required color of the light emitted by the illumination system 12, 14.

Figure 5:
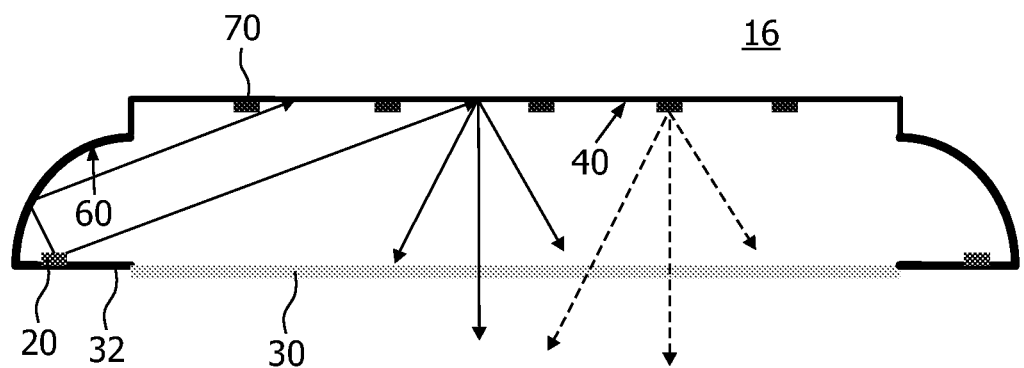
FIG. 5 shows a cross-sectional view of an illumination system according to the invention in which the illumination system, next to the light source, further comprises an array of further light sources arranged at the diffuse reflecting screen.

FIG. 5 shows a cross-sectional view of an illumination system 16 according to the invention in which the illumination system 16, next to the light source 20, further comprises an array of further light sources 70 arranged at the diffuse reflecting screen 40. A color of the light emitted by each of the further light sources 70 in the array of further light source 70 is different from the color of the light emitted by the light source 20. The illumination system 16 as shown in FIG. 5 may, for example, comprise a color-tunable illumination system 16 in which the array of further light source 70 determine a basic color of the light emitted by the illumination system 16 which may be tuned by adding light of the light source 20. The added light from the light source 20 is substantially homogeneously distributed over the light exit window 30 using the specular reflecting mirror 60 which reflects at least part of the light emitted by the light source 20 over the diffuse reflecting screen 40. For example, when the array of further light source 70 emit substantially white light, the adding of red light, for example, emitted by the light source 20 reduces a color temperature of the white light of the array of further light sources 70. Alternatively when adding blue light, for example, emitted by the light source 20 to the substantially white light emitted by the array of further light sources 70 the color temperature of the white light increases. In an embodiment of the illumination system 16 according to the invention, the light source 20 is constituted of an array of light sources 20 arranged, for example, on the ridge 32 and which array comprises both blue-light emitting LEDs and red-light emitting LEDs. This arrangement of LEDs 20 would allow the color temperature of the light emitted by the illumination system 16 to be both increased and decreased, depending on which color from the array of light sources 20 would be added to the light emitted by the array of further light sources 70. Consequently, the tunability of the illumination system 16 according to the invention is increased.

Figure 6A:
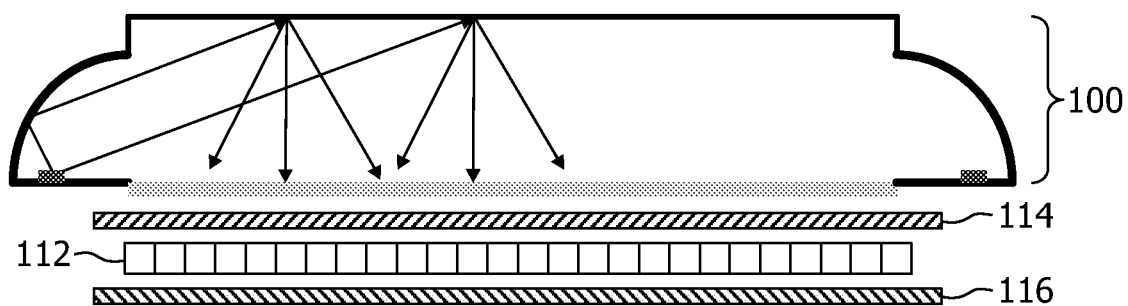
FIG. 6A shows a cross-sectional view of a display device comprising a backlighting system comprising the illumination system according to the invention.

FIG. 6A shows a cross-sectional view of a display device 110 comprising a backlighting system 100 comprising the illumination system 2 according to the invention. The display device 110 may, for example, be a liquid crystal display device 110 which comprises a layer of electrically connected (not shown) liquid crystal cells 112, a polarizing layer 114, and an analyzing layer 116. Alternatively, the display device 110 may be any other non-emissive display device 110.

Figure 6B:
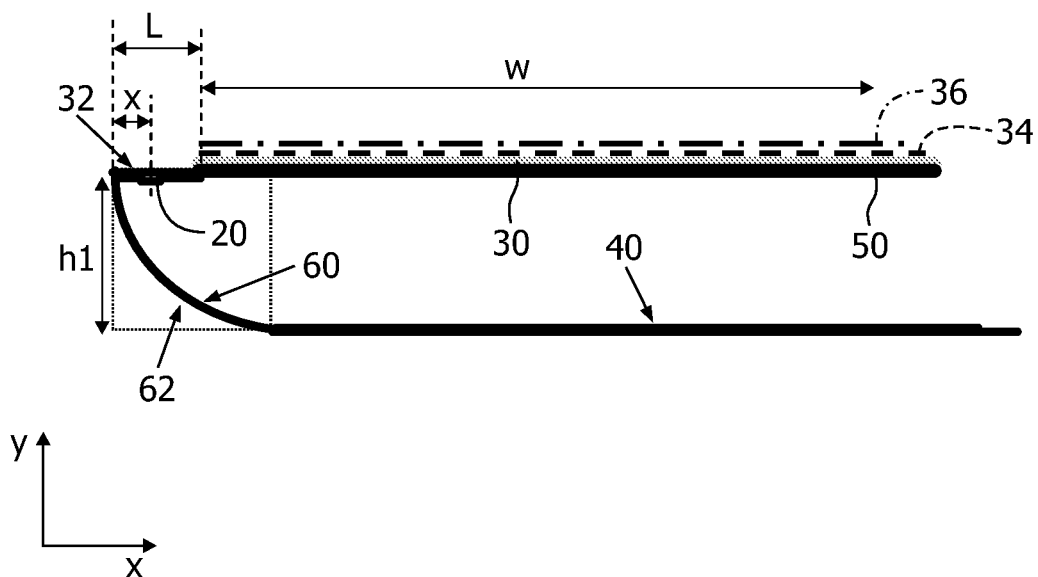
FIG. 6B shows a detailed view of the cross-sectional view of the backlighting system for use in a display device.

FIG. 6B shows a detailed view of the cross-sectional view of the backlighting system 101 for use in a display device 100. The diffuse reflecting screen 40 comprises a white diffuse highly reflective Lambertian reflector, for example, an additional layer of inorganic particles ($Al_2O_3$, $BaSO_4$, $ZrO_2$) and binder which is sprayed on the diffuse reflecting screen 40 (indicated with a gray line in FIG. 6B). Also the side of the ridge 32 facing the specular reflecting mirror 60 preferably comprises the white diffuse Lambertian reflector. The light exit window 30 comprises a layer of luminescent material 50, preferably at a side of the light exit window 30 facing the diffuse reflecting screen 40. The light exit window 30 further comprises a Brightness Enhancement Film 34 indicated with a dashed line on top of the light exit window 30. The Brightness Enhancement Film 34, for example, comprises a reflectivity of approximately 50%. The Brightness Enhancement Film 34 further comprises a Double Brightness Enhancement Film 36 for further improving the luminance uniformity of the light emitted by the backlighting system 101. Also this Double Brightness Enhancement Film 36 comprises a reflectivity of approximately 50%. The specular reflecting mirror 60 is concavely shaped, for example, according to the following equation:

$$y(x) = -35*((x/35)^{1/2},$$

in which the y-axis is arranged substantially parallel to the normal axis (not shown) to the light exit window 30, and in which the x-axis is arranged substantially parallel to the light exit window 30. Preferably the inside of the backlighting system 101 between the light exit window 30 and the diffuse reflecting screen 40 comprises air to reduce the weight of the backlighting system 101. For example, to obtain a 32 inch backlighting system 101, the edge wall 62 may, for example, have a height h1 being equal to 35 millimeter, the position x of the light emitting diode 20 may, for example, be 7 millimeter, a width w of the light exit window 30 may, for example, be 400 millimeter, the ridge 32 may, for example, be 20 millimeter, and a pitch between the light emitting diodes along a direction substantially perpendicular to the cross-section shown in FIG. 6B may, for example, be 90 millimeter.

Figure 7A:
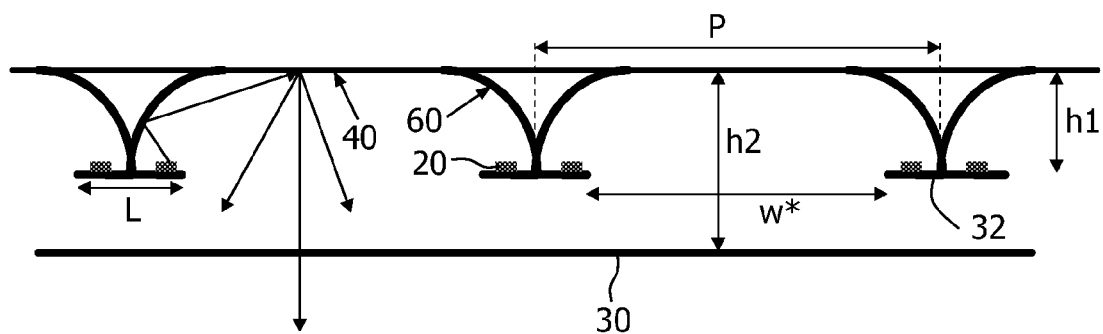
FIGS. 7A and 7B show cross-sectional views of a backlighting system or luminaire which comprise a plurality of illumination systems arranged adjacent to each other.
Figure 7B:
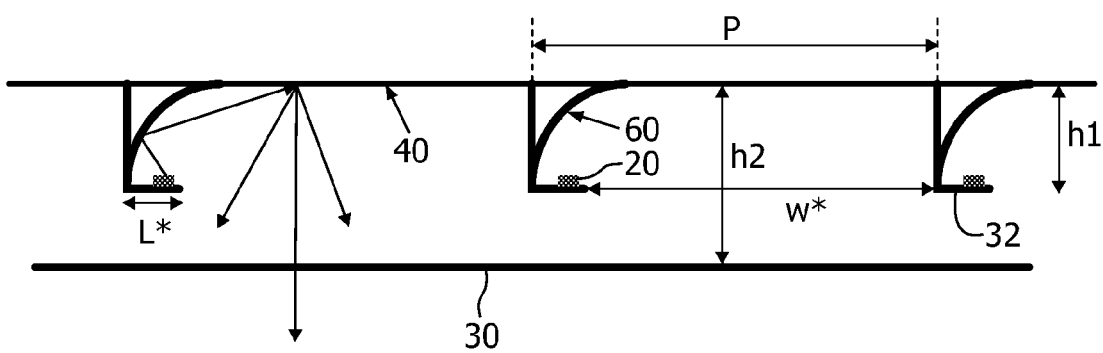

FIGS. 7A and 7B show cross-sectional views of a backlighting system 102, 103 or luminaire 102, 103 which comprise a plurality of illumination systems arranged adjacent to each other. A benefit of this embodiment is that substantially any size of backlighting systems 102, 103 or luminaires 102, 103 may be made having a substantially uniform luminance distribution at the light exit window 30. Again the height h2 of the individual illumination systems is larger than the height h1 of the specular reflecting mirror 60. The height h2 of the individual illumination system must be chosen to be large enough to avoid shadow formation of the ridge 32 on the light exit window 30. The plurality of illumination systems are arranged at a pitch P. The side of the ridge 32 facing the light exit window 30 is preferably highly diffusely reflective to further avoid shadow formation of the ridge 32 on the light exit window 30.

The embodiment of the backlighting system 102 or luminaire 102 as shown in FIG. 7A the individual illumination systems each comprise two specular reflective mirrors 60 arranged opposite of each other, each having a row of light emitting diodes 20. A benefit of this embodiment is that the use of two specular reflective mirrors 60 enables a uniform distribution of the light emitted by the light emitting diodes 20 over the diffusely reflective screen 40. A drawback however is that the ridge 32 is relatively broad which may form a shadow on the light exit window 30. Increasing the height h2 of the backlighting system 102 or luminaire 102, or providing the side of the ridge 32 facing the light exit window 30 with a highly diffusely reflecting layer reduces the non-uniformity caused by this relatively large ridge 32.

The embodiment of the backlighting system 103 or luminaire 103 as shown in FIG. 7B the individual illumination systems each only comprise a single specular reflective mirror 60 arranged opposite a substantially straight wall. This arrangement reduces the dimension of the ridge 32 which improves the uniformity or which may reduce a height h2 of the backlighting system 103 or luminaire 103. A drawback of this arrangement is that only a single specular reflective mirror 60 is used to generate a substantially homogeneous illumination on the diffusely reflecting screen 40 which requires a more accurate positioning and curvature of the specular reflective mirror 60.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system having a light exit window for emitting light from the illumination system, the illumination system comprising:
   a diffuse reflecting screen arranged opposite the light exit window,
   a light source being arranged for indirect illumination of the light exit window via the diffuse reflecting screen, the light source being arranged near an edge of the light exit window on an imaginary plane substantially parallel to the light exit window, the light emitted from the light source having an angular distribution around a vector pointing away from the light exit window, the vector being inclined with respect to a normal axis of the imaginary plane for reducing a glare of the illumination system, and
   an edge wall arranged between the diffuse reflecting screen and the light exit window, the edge wall comprising a specular reflecting mirror being concavely shaped for reflecting at least part of the light emitted by the light source towards the diffuse reflecting screen.

2. Illumination system as claimed in claim 1, wherein the specular reflecting mirror comprises a shape for generating a substantially uniform illumination of the part of the diffuse reflecting screen.

3. Illumination system as claimed in claim 1, wherein the specular reflecting mirror comprises a paraboloidal shape.

4. Illumination system as claimed in claim 1, wherein the light source is arranged on a ridge arranged at the edge of the light exit window, the specular reflecting mirror being arranged at a side of the light source facing away from the light exit window.

5. Illumination system as claimed in claim 1, wherein the diffuse reflecting screen comprises a structured reflecting surface.

6. Illumination system as claimed in claim 5, wherein the structured reflecting surface comprises a plurality of elongated prismatic, pyramidal, or conical structures.

7. Illumination system as claimed in claim 1, wherein the diffuse reflecting screen comprises a collimating plate a redirecting foil, or a plurality of lamellae (44) arranged substantially perpendicular to the diffuse reflecting screen.

8. Illumination system as claimed in claim 1, wherein a ratio between a height (h2) of the illumination system and a width (w) of the light exit window is larger than or equal to 1/20, wherein the height (h2) is a dimension of the illumination system substantially perpendicular to the light exit window and wherein the width (w) of the light exit window is a minimum dimension of the light exit window substantially parallel to the light exit window.

9. Illumination system as claimed in claim 1, wherein the illumination system comprises a remote phosphor layer arranged on the diffuse reflecting screen and/or on the light exit window, the remote phosphor layer being a layer comprising a luminescent material for converting at least part of the light emitted by the light source into light having a different color.

10. Illumination system as claimed in claim 1, wherein the illumination system further comprises an array of further light sources arranged on the diffuse reflecting screen for direct illumination of the light exit window, a color of the light emitted by the light source being different from a color of the light emitted by the array of further light sources.

11. Illumination system as claimed in claim 1, wherein the light exit window comprises a diffuser, or a Brightness Enhancement Film, or Micro Lighting Optics, or a prismatic sheet, or a plurality of lamellae arranged substantially perpendicular to the light exit window.

* * * * *